United States Patent [19]

Kingsley

[11] 4,159,424
[45] Jun. 26, 1979

[54] TRAPEZOIDAL SCINTILLATOR FOR RADIATION DETECTORS

[75] Inventor: Jack D. Kingsley, Schenectady, N.Y.

[73] Assignee: General Electric Company, Schenectady, N.Y.

[21] Appl. No.: 892,842

[22] Filed: Apr. 3, 1978

[51] Int. Cl.² ............................................... G01T 1/00
[52] U.S. Cl. .................................................. 250/483
[58] Field of Search ............... 250/483, 485, 486, 487, 250/361, 363, 505, 445 T

[56] References Cited

U.S. PATENT DOCUMENTS

| | | | |
|---|---|---|---|
| 2,659,679 | 11/1953 | Koller | 250/486 |
| 2,682,478 | 6/1954 | Howse | 250/486 |
| 3,584,216 | 6/1971 | Tinney | 250/486 |
| 3,912,928 | 10/1975 | Rush et al. | 250/483 |

Primary Examiner—Bruce C. Anderson
Attorney, Agent, or Firm—Geoffrey H. Krauss; Joseph T. Cohen; Marvin Snyder

[57] ABSTRACT

Radiation detectors, receiving poly-energetic radiation quanta, utilize scintillator elements having a trapezoidal cross-section to reduce the variation in response to the quanta of different energies when the scintillator front surface is not aligned perfectly perpendicular to the radiation quanta path of travel.

9 Claims, 2 Drawing Figures

TRAPEZOIDAL SCINTILLATOR FOR RADIATION DETECTORS

BACKGROUND OF THE INVENTION

The present invention relates to radiation detectors and, more particularly, to a novel scintillator element having a trapezoidal cross-section for use in radiation detectors.

Many radiation inspection systems, such as X-ray systems of the computerized tomography type, require measurement of radiation flux with a high degree of precision. In a typical computerized tomography X-ray system, a degree of precision generally allowing less than 0.1% error is desirable. In medical X-ray technology, the time during which a patient is exposed to X-radiation is desirably as short as possible; a poly-energetic X-ray source is utilized to effect a shortened patient exposure time. In those radiation inspection systems, such as a computerized tomography system, a plurality of radiation detectors simultaneously measure the X-ray flux after differential absorption thereof upon passage through the patient, and the detector element of each detector must respond to X-ray signals in manner substantially identical to the response of all other detector elements, even though the X-ray signal received at any one particular detector of the plurality thereof has a variable X-ray spectrum and a widely varying intensity.

In radiation inspection systems utilizing solid state detectors, a scintillating element is utilized to convert the differentially absorbed radiation to optical photons, and means are provided for detecting the radiation-induced fluorescence from the scintillator. Typically, means are provided for collimating the incident radiation to limit the angle over which the radiation can enter the scintillator element. A typical X-ray detector for computerized tomography utilizes a collimating means consisting of flat plates of a high atomic number material such as tungsten or tantalum, arranged to be normally parallel to the direction of incidence of the X-ray flux, with a rectangular parallelopiped scintillator bar positioned between the plates and at least one photosensor arranged to intercept a major faction of the optical photons produced by the scintillator, without appreciably affecting the magnitude of the incident X-ray flux. The response of such a detector to X-ray energy is highly dependent upon not only the degree to which X-rays are scattered off the collimating plates, but also to the dimensional perfection of the rectangular parallelopiped scintillator element; typically, only a one-part-per-thousand deviation from a perfect rectangular parallelopiped shape can be tolerated. Accordingly, it is desirable to provide a radiation detector, of the scintillator element-collimator plate type, having a reduced response variation with change in scintillator element positioning.

BRIEF SUMMARY OF THE INVENTION

In accordance with the invention, a radiation detector utilizes a pair of collimator plates aligned parallel to the direction of travel of incident radiation quanta, a scintillator element of non-rectangular parallelopiped shape and positioned between the collimator plates to convert incident radiation quanta to optical photons, and at least one photosensor positioned to intercept a major fraction of the optical photons emitted by the scintillator element. The scintillator element has a trapezoidal cross-section shape in a plane perpendicular to the facing surfaces of the parallel collimator plates, and having its lateral sides at a predetermined angle with respect to the normal to the base of the trapezoidal element, to reduce variation in detector response to radiaton of differing energies, across a range of incidence angles with respect to the normal to the scintillator element base.

In a preferred embodiment, the scintillator element has a 20 millimeter length and a 4 milliliter thickness with the lengths of the base and top surfaces of the trapezoidal cross-section respectively measuring 2 millimeters and 1.8 millimeters, to have lateral sides positioned at an angle of approximately 1.5° with respect to the normal to the base surface. The error introduced by a 1% misorientation in the angle between the base surface and a surface perpendicular to the plane of the incident x-rays is reduced by approximately 3 orders of magnitude relative to the induced error for a rectangular parallelopiped element with the same degree of misorientation.

Accordingly, it is an object of the present invention to provide a novel radiation detector having a scintillator element of trapezoidal cross section.

This and other objects of the present invention will become apparent upon consideration of the following detailed description and the accompanying drawings.

DETAILED DESCRIPTION OF THE INVENTION

Figure 1:
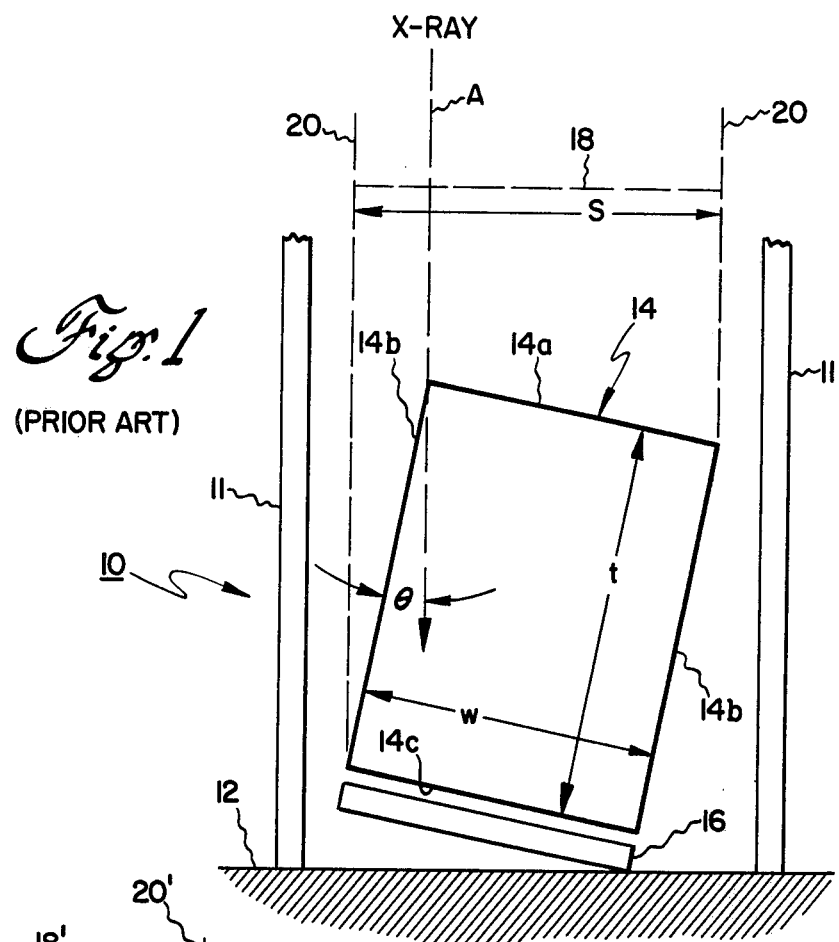
FIG. 1 is a schematic side view of a prior art radiation detector utilizing a rectangular parallelopiped element.

Referring initially to FIG. 1, a prior art radiation detector 10 comprises a pair of collimator plates 11 fabricated of a high atomic material, such as tungsten, tantalum and the like, and positioned with their interior facing surfaces essentially parallel to each other and perpendicular to the plane surface of a detector support member 12. The collimator plates are arranged in spaced-apart manner, and a member 14 fabricated of a scintillating element, such as thallium-doped cesium iodide and the like, is positioned therebetween, for receiving incident radiation flux, such as X-ray quanta traveling in a direction, indicated by arrow A, parallel to the plate surfaces. The radiation quanta arriving along paths substantially different than the line indicated by arrow A, are substantially prevented from impinging upon scintillator member 14 by collimator plates 11. Hitherto, scintillator member 14 has been of rectangular parallelopiped shape with the rectangular cross section (as shown in FIG. 1) having a width w and a thickness t. A photosensor 16, such as a phototransistor, photodiode and the like, is positioned adjacent one surface of scintillator member 14 for reception of the radiation-induced fluorescence from the scintillator. Typically, scintillator member 14 has a length on the order of 20 millimeters (into and out of the plane of the drawing of FIG. 1), a width w on the order of 2 millimeters and a thickness, determined by the requirement that nearly all of the incident X-radiation be absorbed, on the order of 4 millimeters. The width is generally determined by the desired spatial resolution.

Ideally, scintillator member 14 is mounted such that the plane of its top surface 14a is transverse to the direction A of the incident radiation and the planes of the parallel opposed sides 14b are hence parallel to the radiation-incidence direction. The plane of bottom surface 14c, having photosensor 16 adjacent thereto, is also transverse to the radiation-incidence direction and parallel to the surface of supporting member 12. If the rectangular parallelopiped scintillator element is perfectly shaped and perfectly oriented, an angle $\theta$, between the normal to the top surface 14a and the direction of incidence (arrow A) of the incident radiation, will be zero. This orientation is extremely difficult to achieve in practice, especially in a linear array of a plurality of detectors, as used in a fan-beam computerized tomography system. Typically, at least one of the scintillator elements 14, in such an array, is positioned such that one of element sides 14b is at a non-zero angle $\theta$ with respect to the incidence direction of arrow A and the top surface plane 14a is skewed at the same angle $\theta$ to the essentially planar front of the incident radiation.

The response of the scintillator element to poly-energetic radiation will depend upon the angle $\theta$ of the scintillator element surfaces to the incidence direction of the radiation beam. Thus, the lower energy X-rays of the beam are absorbed near the surface of the scintillator member exposed to the beam and the fluorescence produced for soft X-rays is proportional to the total area subtended by the scintillator, as seen from the X-ray source (not shown). The width 18 of the subtended area, of dimension S, is defined between a pair of imaginary lines 20 parallel to each other and to the direction of radiation incidence (arrow A) and tangent to the points on the cross-section of the scintillator element furthest apart in a plane transverse to the direction of radiation incidence, which plane is also the plane of subtended width 18. Thus, in the extreme case of a misorientation by 90°, i.e. $\theta = 90°$, one of sides 14b would be transverse to the direction of X-ray quanta travel and the ratio of response to "soft" X-rays for this orientation, to the correct orientation where $\theta = 0°$, is proportionate to the ratio of thickness t to width w; in the illustrated embodiment, with t=4 millimeters and w=2 millimeters, the 90° misorientation extreme case would result in a soft X-ray response substantially twice as great as the response of a correctly oriented scintillator element to the soft, or less energetic, X-rays. The response of the scintillator element to "hard," or more energetic, X-rays is proportional to the subtended width S times the average thickness, measured along the path of the incident X-rays; the response is thus proportional to the volume of the scintillator member and is substantially independent of orientation. Therefore, as scintillator element 14 is rotated through greater angles $\theta$ from the desired $\tau = 0$ orientation, the response thereof to less energetic X-rays increases, while the response of the scintillator to more energetic X-rays remains substantially constant. The ratio of the responses for any pair of X-ray energies intermediate the lowest and highest energies of the poly-energetic beam, will change in similar manner, with a greater increase being observable for the X-ray flux of lower energy. The magnitude of this lower energy X-ray flux change depends upon the ratio of the width to the thickness and is largest when the width is very small relative to the thickness. For the general case, the subtended width S for a misorientation by an angle $\theta$ is given by: $S = w \cos \theta + t \sin \theta$. Thus, in the illustrated case where w=2 millimeters and t=4 millimeters, a 1° error ($\theta = 1°$) leads to a subtended width S of 2.07 millimeters, or an increase of 3.4% of the subtended area responsive to less energetic X-rays, relative to a properly oriented bar with $\theta = 0$. For a scintillator element having a width w=2 millimeters and a thickness t=1 millimeter, the subtended width S is about 2.017 millimeters (or about 0.86% larger) which error is approximately 4 times smaller than the previous example. However, the reduced thickness in the latter example will not meet the requirement that substantially all of the incident X-rays of relatively greater energy are absorbed by the scintillator element and converted therein to luminescence for reception by photosensor 16. It is apparent that, in a radiation detector array of many elements, the aforementioned response accuracy of 0.1% of each detector relative to any other detector, is difficult to achieve with rectangular parallelopiped scintillator elements 14.

Figure 2:
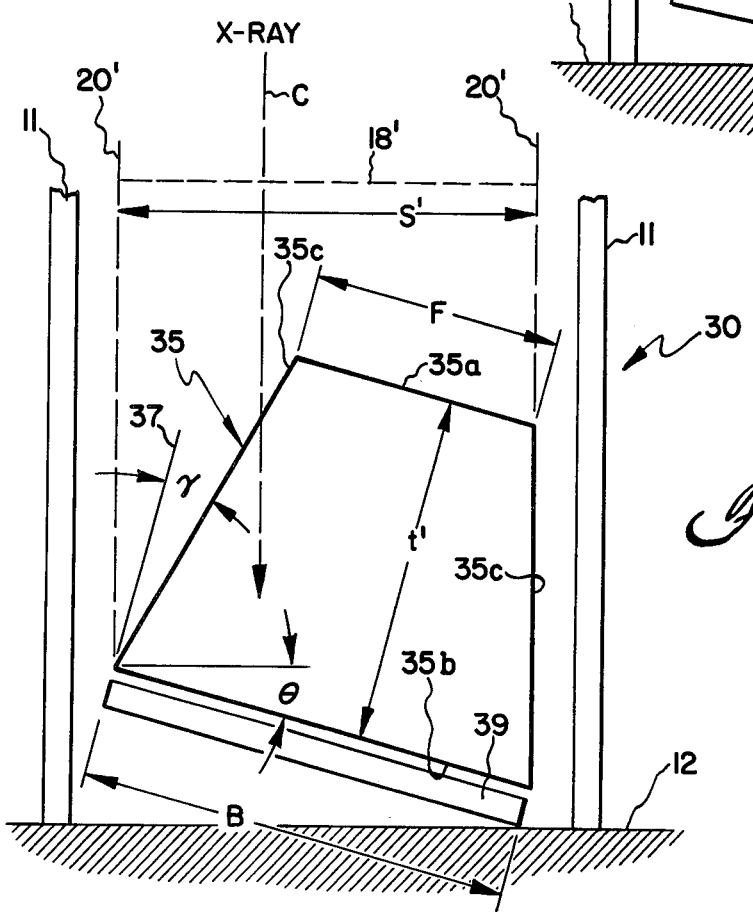
FIG. 2 is a schematic side view of a radiation detector utilizing a scintillator element having a trapezoidal cross-section, in accordance with the principles of the present invention.

Referring now to FIG. 2, a preferred embodiment of my radiation detector 30 is illustrated, with the dimensions and angles thereof (as in FIG. 1) being exaggerated for the purposes of illustration. In detector 30, the spaced, parallel collimator plates 11 are essentially perpendicular to the surface of supporting member 12. A scintillator element 35 is a member having a trapezoidal cross-section in a plane perpendicular to the facing interior surfaces of the collimator plates. Thus, top surface 35a of the scintillator has a front width F which is less than the width B of the back surface 35b and the scintillator element sides 35c are laterally disposed at an angle $\gamma$ with respect to the normal 37 to the essentially parallel front and rear surfaces 35a and 35b, respectively. A photosensor element 39 is disposed parallelly adjacent to rear surface 35b for reception of the X-ray-induced luminescence from scintillator 35. As is known, lateral sides 35c and front surface 35a may be coated with a thin layer of a material which is highly reflective of optical photons, yet is essentially transmissive of X-rays, to cause the radiation-induced luminescence photons to be emitted solely from the rear surface 35b of the scintillator element.

In a preferred embodiment, the length (into and out of the plane of the drawing of FIG. 2) and the thickness t' are, as in the prior art embodiment of FIG. 1, respectively equal to about 20 millimeters and about 4 millimeters. The width B of base surface 35b is set equal to the width w of the embodiment in FIG. 1, i.e. 2 millimeters, while the width F of front surface 35a is set equal to 1.8 millimeters. Therefore, angle $\gamma = \arctan (0.1/4)$ or about 1.43°.

The trapezoidal-cross-sectioned element 35 is mounted with the base surface 35b thereof at some angle $\theta$ to the plane transverse of direction of X-ray travel (arrow C). The subtended width S', along a plane 18' perpendicular to the radiation direction of travel C, is limited by imaginary lines 20' from the furthest extremes of the trapezoidal scintillator element and changes relatively less for small angular displacements, i.e. changes in angle $\theta$ small enough such that lateral surfaces 35c are not visible when looking at the base 35b of the trapezoidal element backward along radiation incidence line C. The extreme case, with a lateral side 35c lying exactly along one of imaginary lines 20', parallel to radiation-incidence line C, is illustrated in FIG. 2. It will be seen that the maximum subtended width S' is equal to the product of the width B of base surface 35b and the cosine of the misorientation angle $\theta$. Thus, for a trapezoidal-cross section scintillator element having the above given dimensions with a maximum misorientation angle $\theta = \gamma = 1.43°$, for a misorientation error of 1°, the subtended width $S' = 2 \cos 1° = 1.9997$ millimeters or about 0.015% less than the subtended width for perfect orientation, with $\theta = 0°$. It will be noted that this misorientation error is less than 1/200th of the change in subtended width S for a similar angular misorientation of the rectangular parallelopiped scintillator element 14 of FIG. 1. Thus, it can be seen that an array of radiation detectors having scintillator elements with trapezoidal cross-section will provide a more uniform response relationship even if misorientation errors of small angular magnitude cannot be eliminated from the detector array fabrication process. It should be understood that a similar trapezoidal cross-section can be used to reduce the sensitivity to misorientation of the scintillator element in orthogonal (length) direction, i.e. in the plane parallel to the facing interior, collimator surfaces and to the radiation incidence path; this results in an element having a truncated-pyramidal shape.

As previously mentioned, one use of the radiation detector is in a computerized tomography system wherein poly-energetic X-rays are utilized. The X-rays in this relatively broad energy range are typically absorbed for depths ranging from 0.1 millimeter ("soft," or less energetic, X-rays) to several millimeters ("hard," or more energetic, X-rays). The X-ray spectra actually detected are thus broad bands which tend to shift both in frequency and in band-width as the thickness and composition of the patient, or other object, under examination is changed. The response of a particular scintillator is related to the scintillator material absorption coefficient $\alpha$. For the rectangular parallelopiped scintillator element 14 of FIG. 1, it can be shown that the relative response to radiation over a broad wavelength, is given by $$w \cos \theta + t \sin \theta - (w \cos\theta - t \sin\theta)e^{-\alpha t/\cos\theta} - (\sin 2\theta)(1/\alpha)(1 - e^{-\alpha t/\cos\theta}).$$

For radiation of relatively low energy, very strong absorption occurs and $\alpha$ tends toward infinity, yielding the above-mentioned response of $(w \cos\theta + t \sin\theta)$. For relatively energetic (and therefore weakly absorbed) X-rays, absorption coefficient $\alpha$ tends towards zero and the relative response tends toward $(\alpha wt)$. As an example, a relatively "soft" flux may be represented by $\alpha = 60$ cm$^{-1}$ (as received directly from the X-ray source) and a relatively "hard" flux may encounter an absorption coefficient $\alpha = 15$ cm$^{-1}$, after passage through a patient. For a perfectly oriented scintillator element 14 with $\theta = 0°$, the ratio of the response for the "hard" flux to the response for the "soft" flux, with the previously given dimensions, is 0.998. As the magnitude of angle $\theta$ increases, the response ratio decreases in manner shown in Table I.

TABLE I

| $\theta$ | 0° | 0.2° | 0.5° | 1.0° |
|---|---|---|---|---|
| Ratio Change | 0% | −0.17% | −0.42% | −0.83% |

Thus, a change of slightly greater than 0.1° will lead to a decrease of about one part in a thousand, which decrease is, as previously mentioned, undesirable and may lead to serious errors in the reconstructed picture of the patient.

A radiation detector utilizing my novel trapezoidal scintillator element 35 (FIG. 2) has a relative response given by $$B \cos\theta - F \cos\theta e^{-\alpha t/\cos\theta} - (2 \tan\gamma \cos^2\theta)(1/\alpha)(1 - e^{-\alpha t/\cos\theta}).$$

Utilizing the above-mentioned dimensions (B = 2 millimeters, F = 1.8 millimeters and $\gamma = 1.43°$) and the representative absorption coefficients $\alpha = 60$ cm.$^{-1}$ for "soft" X-ray spectra and $\alpha = 15$ cm.$^{-1}$ for "hard" X-ray spectra, the relative response for similar angular changes is tabulated in Table II.

TABLE II

| $\theta$ | 0° | 0.2° | 0.5° | 1.0° |
|---|---|---|---|---|
| Ratio Change | 0% | $1.6 \times 10^{-5}$% | $10^{-4}$% | $4 \times 10^{-4}$% |

Thus, it will be seen that the error introduced by a 1% misorientation is reduced some 2000 times by utilizing my novel scintillator element with trapezoidal cross-section. However, it should be understood that a mounting misorientation with $\theta$ greater than the lateral angle $\gamma$ causes errors to increase rapidly, in accordance with the relative response formula $$(F\cos\theta - t(\sin\theta - \cos\theta \tan \gamma))(1 - e^{-\alpha t/\cos\theta}) + 2t \sin\theta - (1/\alpha) \sin 2\theta(1 - e^{-\alpha t/\cos\theta})$$

where $\theta$ is greater than or equal to $\gamma$. Thus, the mounting tolerance must be less than the angle $\gamma$, which mounting tolerance is achievable for angles $\gamma$ on the order of 1.5°.

There has been described a novel radiation detector utilizing a scintillator element having a trapezoidal cross-section in a plane parallel to the direcion of radiation incidence, for reducing the change in response due to misorientation errors when mounting the scintillator element. It will be understood that one preferred embodiment has been illustrated herein and that many modifications and variations may be carried out by those skilled in the art. It is my intent, therefore, to be limited not by the specific embodiment disclosed herein, but only by the scope of the appending claims.

What is claimed is:

1. Apparatus for detecting radiation incident thereon from a first direction, comprising:
    a scintillation member formed of a material converting the incident radiation to quanta of another wavelength, said member having a trapezoidal cross-section in a first plane essentially parallel to the direction of radiation incidence and having essentially parallel front and back surfaces and a pair of lateral side surfaces each forming essentially a first angle to a normal to said front surface;
    said trapezoidal scintillator member being maintained with the plane of said front surface at a second angle, less than said first angle, with respect to a plane transverse to the direction of radiation travel.

2. The apparatus as set forth in claim 1, further comprising means adjacent said scintillator member rear surface for receiving said quanta of another wavelength.

3. The apparatus of claim 2, wherein said quanta receiving means is at least one photosensor.

4. The apparatus of claim 1, further comprising a pair of essentially planar collimator plates extending substantially parallel to said direction of radiation incidence and substantially perpendicular to said first plane, one of said plates being positioned beyond each lateral side surface of said scintillator member.

5. Apparatus as set forth in claim 1, wherein said first angle is about 1.5°.

6. The apparatus set forth in claim 5, wherein the ratio of the width of the front surface to the width of back surface of said scintillator member is about 0.9.

7. The apparatus as set forth in claim 6, wherein said member has a thickness, in the direction normal to said front and back surfaces, of about 4 millimeters.

8. The apparatus as set forth in claim 7, wherein said member has a length of about 20 millimeters.

9. Apparatus as set forth in claim 5, wherein the ratio of the width of the back surface to the thickness of said member, in a direction normal to said back surface, is about 0.5.